(12) United States Patent
Nieberlein et al.

(10) Patent No.: US 9,923,248 B2
(45) Date of Patent: Mar. 20, 2018

(54) RECHARGEABLE BATTERY UNIT AND CHARGING METHOD

(75) Inventors: Uwe Nieberlein, Roth (DE); Dennis Stuhlmacher, Bad Kreuznach (DE)

(73) Assignee: DIEHL AEROSPACE GMBH, Uberlingen (DE)

( * ) Notice: Subject to any disclaimer, the term of this patent is extended or adjusted under 35 U.S.C. 154(b) by 662 days.

(21) Appl. No.: 13/583,101

(22) PCT Filed: Mar. 11, 2011

(86) PCT No.: PCT/EP2011/001206
§ 371 (c)(1),
(2), (4) Date: Sep. 6, 2012

(87) PCT Pub. No.: WO2011/116887
PCT Pub. Date: Sep. 29, 2011

(65) Prior Publication Data
US 2013/0009608 A1 Jan. 10, 2013

(30) Foreign Application Priority Data
Mar. 25, 2010 (DE) .......................... 10 2010 012 854

(51) Int. Cl.
*H02J 7/00* (2006.01)
*H01M 10/44* (2006.01)

(52) U.S. Cl.
CPC .................................... *H01M 10/44* (2013.01)

(58) Field of Classification Search
CPC ...................................................... H02J 7/007
(Continued)

(56) References Cited

U.S. PATENT DOCUMENTS 5,260,638 A 11/1993 Hirahara
6,046,575 A * 4/2000 Demuro ................ H02J 7/0031
320/134
(Continued)

FOREIGN PATENT DOCUMENTS

DE 695 18 659 T2 4/2001
DE 698 24 887 T2 7/2005
(Continued)

OTHER PUBLICATIONS

English Abstract of WO 99/17418 A1, dated Apr. 8, 1999 (corresponding to DE 698 24 887).
(Continued)

*Primary Examiner* — Drew A Dunn
*Assistant Examiner* — Zixuan Zhou
(74) *Attorney, Agent, or Firm* — Scully Scott Murphy and Presser

(57) ABSTRACT

A rechargeable battery unit and method for charging a battery is provided. The battery unit can be connected to a constant current charging device for charging the battery unit. The constant current charging device has a plurality of poles and a cut-off voltage. The battery unit has an internal resistance, a lithium battery cell having a predetermined end-of-charge voltage, and a switch unit. The switch unit is configured to enable alteration of the internal resistance when the predetermined end-of-charge voltage has been reached, such that the voltage at the poles of the constant current charging device is greater than the cut-off voltage of the constant current charging device to terminate the charging process.

16 Claims, 2 Drawing Sheets

(58) Field of Classification Search
USPC .......................................... 320/116, 162–163
See application file for complete search history.

(56) References Cited

U.S. PATENT DOCUMENTS

| | | | |
|---|---|---|---|
| 2001/0000212 A1* | 4/2001 | Reipur et al. ................. | 320/104 |
| 2001/0028238 A1* | 10/2001 | Nakamura et al. ........... | 320/132 |
| 2002/0177034 A1* | 11/2002 | Kimura et al. ................. | 429/61 |
| 2007/0182371 A1* | 8/2007 | Boebel .......................... | 320/112 |
| 2009/0051320 A1 | 2/2009 | Muntermann | |
| 2009/0146607 A1* | 6/2009 | Yang ...................... | H02J 7/345 |
| | | | 320/103 |

FOREIGN PATENT DOCUMENTS

| | | |
|---|---|---|
| DE | 10 2005 011 081 A1 | 9/2006 |
| EP | 1 263 110 A2 | 12/2002 |
| EP | 1 768 225 A1 | 3/2007 |
| JP | 9-285018 A | 10/1997 |
| JP | 10-21967 A | 1/1998 |
| WO | WO 98/23021 A2 | 5/1998 |

OTHER PUBLICATIONS

English Abstract of WO 96/13890 A1, dated Apr. 19, 2001 (corresponding to DE 695 18 659).
International Search Report dated Aug. 1, 2011 issued in PCT/EP2011/001206.

* cited by examiner

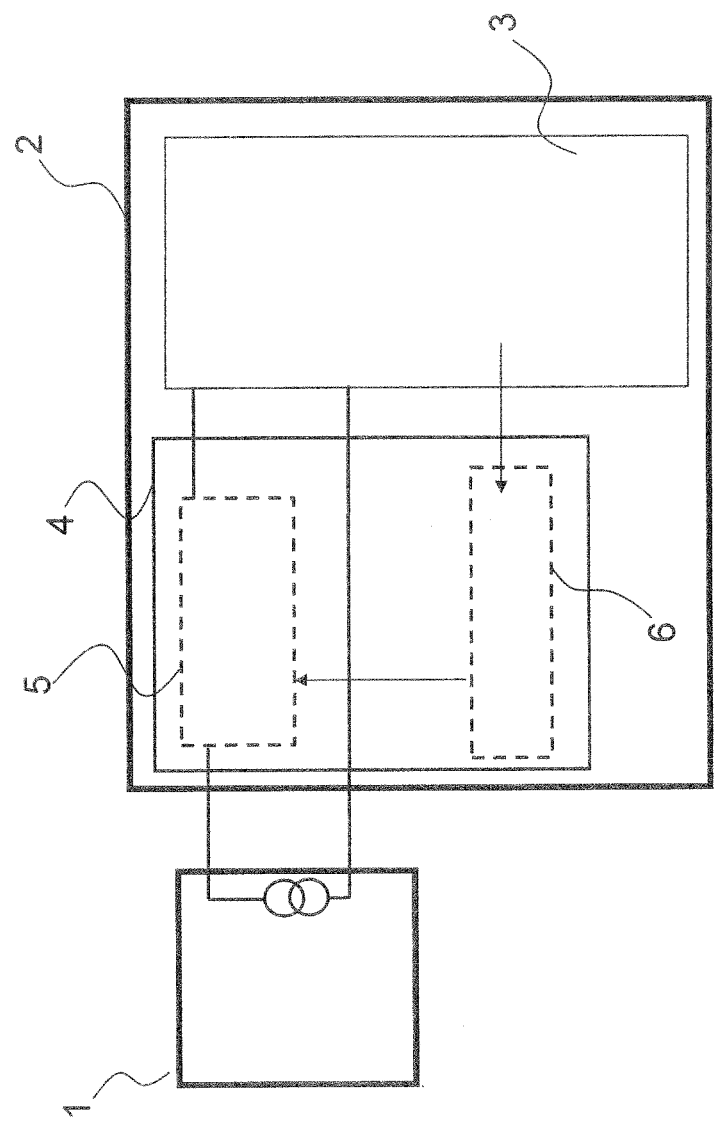

RECHARGEABLE BATTERY UNIT AND CHARGING METHOD

The present invention relates to a battery unit and a charging method for charging such a battery unit.

BACKGROUND

Nickel-cadmium (NiCd) batteries are known from the prior art. Because of the heavy metal cadmium that they contain, they are harmful to the environment and can essentially only be used for special applications such as, for example, emergency power supplies.

It is likely that because cadmium-based batteries will become less available, cadmium-free batteries will increasingly be used for special applications too. It is especially likely that cadmium-based batteries will be replaced by cadmium-free batteries. This is expensive, however, because in some circumstances peripheral devices such as charging devices and the like need to be replaced too.

SUMMARY

Against this background, the object of the invention is to provide a battery unit in which conventional cadmium-based batteries can be replaced without a high degree of complexity and especially cost. A method for charging such a battery unit is also provided.

A battery unit with at least one battery cell is provided according to an aspect of the invention, wherein the battery unit comprises at least one switch unit which is designed to modify the internal resistance of the battery unit, in particular in a targeted fashion.

The internal resistance of the battery unit is here understood as the resistance of the whole battery unit, especially including the switch unit, that appears externally. The internal resistance is in particular that resistance or impedance that opposes a charging device connected to the battery unit in order to charge it up.

The battery cell is preferably a lithium-based battery cell, a lithium cell for short. Such battery cells are, at least currently, not harmful to the environment.

The term "switching" is, within the context of the invention, in particular understood to be a process in which the way the battery unit behaves with the outside, for example with a charging device, is altered. Such an alteration can here mean that the battery unit is transferred from a first, in particular a defined state into a second, in particular defined second state, or vice versa. Electromechanical and/or electronic switches can, for example, be used to do this. It is, however, also possible for the alteration to take place dynamically, in particular continuously and/or virtually continuously.

The battery unit is capable of replacing existing NiCd batteries without the need for any further significant adaptations or modifications, in particular with respect to the charging devices. This means specifically that the charging devices used in conventional NiCd systems can continue to be used, with only the NiCd batteries being replaced by battery units with lithium cells.

This is not straightforward for lithium cells in particular as lithium cells and NiCd cells each require different charging methods.

Whereas NiCd batteries are charged with constant current charging devices, lithium cells require constant voltage charging devices. The charging-up of lithium cells using the constant current charging devices used for NiCd cells is possible with the battery unit according to the invention. This is explained in more detail below.

It may be particularly advantageous if the switch unit is designed such that the internal resistance of at least one of the at least one battery cell is altered depending on the charging voltage of the battery cell. The charging voltage or the state of charge of just one or also of multiple battery cells can be taken into consideration here. Lithium cells cannot be, or it is not known for them to be, charged up above the end-of-charge voltage. If then, in the battery unit according to the invention, the internal resistance is, for example, altered and especially increased when the end-of-charge voltage has been reached in such a way that the voltage present at the poles of a constant current charging device is greater than its cut-off voltage, the charging process is interrupted so that damage to the battery cell or cells by further charging can be avoided. Altering the internal resistance can thus prevent the lithium cell or cells from being charged above the maximum tolerated end-of-charge voltage.

End-of-charge voltage is understood to be the voltage up to which one, multiple or all battery cells of the battery unit are or can be charged.

The switch unit can comprise a controller and a controllable switch element coupled to it which is designed to alter the internal resistance. The controller preferably controls the switch element depending on the charging voltage of at least one of the at least one battery cell. It is also possible to monitor the charging voltages of multiple or all battery cells.

The switch unit can comprise at least one in particular controllable component, selected from the group including ohmic resistors, semiconductor components with modifiable or controllable impedance, in particular MOSFET transistors. To alter the internal resistance, one or more of the components can be connected in series to the battery cell or cells, or an already made series connection can be canceled. The series connection can thus be formed or canceled by means of a switch, in particular an electromechanical and/or electronic switch, in particular a semiconductor switch.

When the battery unit comprises multiple battery cells, each battery cell can be coupled to or interact with a respective switch unit. It is alternatively also possible for a switch unit to be coupled to or interact with multiple battery cells. In the simplest case, just one switch unit is provided for all the battery cells. When a series connection has been made, the internal resistance of the battery unit is essentially identical to the sum of the resistance or impedance of the component and the internal resistance of the battery cell or cells.

A charging method for charging a battery unit comprising at least one battery cell, in particular a lithium cell, is provided in claim 5. In the charging method, the internal resistance of the battery unit is altered, in particular increased, when the at least one lithium cell reaches or has reached a predetermined, preferably maximum end-of-charge voltage, and in particular decreased when at least one of the at least one battery cell falls below a predetermined charging voltage.

By altering and in particular increasing the internal resistance, it may for example be achieved that the voltage present at the whole battery unit during the charging process is increased to a value that is greater than a cut-off voltage of the constant current source, in particular of the constant current charging device. It is alternatively also possible to simulate a voltage profile that results in the termination of the charging process in the constant current charging device. Similarly, when the battery cell is to be recharged, the internal resistance can be altered accordingly so that the charging device continues the charging process.

As already explained above, the charging process can in this way be interrupted when at least one of the at least one battery cell of the battery unit has reached a predetermined, in particular maximum end-of-charge voltage. A further charging process that may possibly result in the destruction of the battery unit and specifically the battery cell or cells can be prevented.

The respective instantaneous charging voltage or voltages of one or more battery cells can thus be detected continuously or at certain intervals. To do this, a voltage checking unit can be provided which in particular can be part of the controller. The controller can as desired alter the internal resistance in a targeted fashion on the basis of the respective detected charging voltage or voltages. As already mentioned, such an alteration can be made in bursts or continuously.

Constant current charging devices that interrupt the charging process when a cut-off voltage has been reached are used in particular with NiCd cells in order to prevent overloading or loading batteries that are no longer functional. As already mentioned, the constant current charging devices used with NiCd cells are not suitable for charging up lithium-based batteries without any other measures being taken. With constant current charging devices, the maximum end-of-charge voltages to be observed with lithium cells would be exceeded without any other measures being taken, which would result in them being destroyed.

It is now possible using the proposed method to interrupt the charging process at a point in time at which there is no likelihood of damage caused by charging. It is in particular possible to prevent the end-of-charge voltage being exceeded. The charging process can thus be interrupted by the internal resistance being altered and in particular increased, when the predetermined end-of-charge voltage is reached, in such a way that the voltage present over the battery unit exceeds the cut-off voltage of the constant current charging device. It is alternatively also possible to alter the internal resistance in such a way that a voltage profile is simulated that normally results in the termination of the charging process in the constant current charging device.

It has been shown that with the proposed method lithium-based battery units can be charged without problem using charging devices originally provided for NiCd cells. By altering the internal resistance, the charging process can be terminated either using the automatic cut-off provided or by simulating the voltage profile typical of NiCd cells without the end-of-charge voltage being exceeded. In this way, Cd-based batteries can be replaced relatively easily by other, in particular lithium-based battery units.

The internal resistance can be altered by connecting at least one of the battery cells in series with an electronic component having a predetermined impedance, i.e. with an additional consumer. The internal resistance can be decreased accordingly when the series connection is canceled.

The component can be an ohmic resistor and/or a semiconductor component with modifiable or controllable impedance, in particular a MOFSET transistor.

The series connection can be made in particular using an electromechanical and/or electronic switch.

BRIEF DESCRIPTION OF THE DRAWINGS

Exemplary embodiments of the invention are described in more detail below with the aid of the drawings, in which:

FIG. 1 shows a battery unit connected to a constant current charging device;

DETAILED DESCRIPTION OF EXEMPLARY EMBODIMENTS

Figure 3:
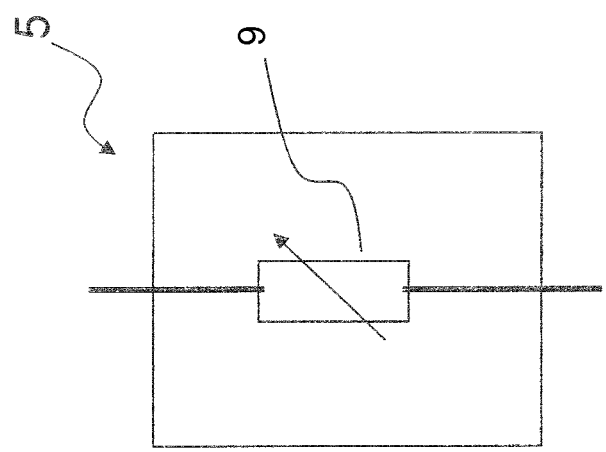
FIG. 3 shows a further exemplary embodiment of a switch element.

The battery unit is described in the exemplary embodiments for a lithium-based battery cell without limiting the invention to such systems. Moreover, battery units with only one battery cell are described in the exemplary embodiments. It should, however, be pointed out that, as noted above, a battery unit can also have multiple battery cells and/or multiple switch units. One or more switch units can thus be associated with either one or more battery cells.

Identical elements or elements with the same function are always labeled with the same reference numerals.

FIG. 1 shows a battery unit 2 connected to a constant current charging device 1. The battery unit 2 comprises a lithium-based battery cell 3, a lithium cell 3 in short. The battery unit 2 also comprises a switch unit 4.

The battery unit 2, in particular the switch unit 4, functions as follows:

As already mentioned, cadmium-based batteries such as NiCd batteries are considered harmful to the environment. For this reason, alternative technologies need to be found or used. However, it is desirable here if alternative technologies can be used in a particularly simple and inexpensive fashion, in particular as replacements for existing NiCd batteries.

As a direct result, the problem arises that the charging devices used and available for NiCd batteries are not suitable for lithium cells. This has the consequence that if a change is made to lithium cells, all the charging devices must be replaced too. The invention has identified this problem and provides a solution by means of which existing NiCd batteries can be replaced relatively easily by battery units with lithium cells.

In general terms, this problem is solved by the charging behavior of the lithium cell 3 being altered by other measures in such a way that existing NiCd charging devices which are constant current charging devices can continue to be used unaltered.

The other measures consist in particular of the lithium cell 3 being coupled to or interacting with a switch unit 4. The switch unit 4 is designed so as to alter the internal resistance of the battery unit 2. It is thus possible to use the automatic cut-off, which is usually necessarily provided, in constant current charging devices 1 and in particular in charging devices for NiCd batteries when a maximum charging voltage is exceeded in order to terminate the charging process when a maximum end-of-charge voltage of the lithium cell 3 is reached. It is customary and necessary to provide an automatic cut-off in constant current charging devices because, in the case of old or defective batteries in which essentially no charging current can flow, the voltage would be adjusted upwards randomly, which must in particular be prevented from a safety perspective. In customary NiCd charging devices, the automatic cut-off takes place at a cut-off voltage that corresponds to an upper or maximum permissible NiCd cell voltage of, for example, 1.6 V per battery cell.

The background for terminating the charging process when the maximum end-of-charge voltage is reached will be explained in detail with a comparison of NiCd batteries and lithium-based batteries.

NiCd batteries and lithium cells 3 require fundamentally different charging processes. Whereas constant current charging devices are used with NiCd batteries, constant voltage charging devices are required for lithium cells 3.

The NiCd constant current charging device charges the NiCd battery with constant current, the cell voltage of the NiCd battery cells being set automatically and rising as the state of charge increases. Once the NiCd battery is charged up, it is no longer able to take in the energy supplied and heats up. Because it heats up, the internal resistance of the cell reduces and the cell voltage consequently falls whilst the charging voltage remains constant. The constant current charging device is designed in such a way that it detects the fall in the cell voltage, also called "-delta U", and uses it as a trigger for terminating the charging process. Thus when the constant current charging device detects the occurrence of the "-delta U", the charging process for the NiCd battery is terminated. The instantaneous electrical power supplied to the NiCd battery during the charging process initially remains virtually constant and then rises as far as "-delta U". In order to prevent inappropriately high voltages being applied, for example, to defective NiCd batteries, the constant current charging devices have an automatic cut-off by means of which the charging process is interrupted when a predetermined maximum voltage has been reached.

In contrast, in conventional lithium cells 3 the charging process takes place with a constant voltage, a current limiter being required to prevent excessively high current strengths. The end-of-charge voltage of the lithium cell 3 is thus predetermined. During the charging process, the current is set essentially automatically. Under the action of the current limiter, the charging current is however limited to a corresponding maximum value when and whilst the charging current reaches or exceeds the maximum value. At the end of the charging process when the lithium cell has reached its end-of-charge voltage, the charging current falls to zero. The charging process of the lithium cell 3 is terminated by the constant voltage charging device when the charging current falls below a predetermined current value. The instantaneous electrical power supplied to the lithium cell 3 during the charging process initially remains virtually constant over a certain period of time owing to the current limiter, in a similar fashion to the NiCd battery cell. In contrast to the NiCd battery cell, the instantaneous power falls to zero from the point in time at which the lithium cell has reached its end-of-charge voltage.

It is thus clear that, in particular whilst the current limiter is active during the charging process of the lithium cell 3, the charging curve of the lithium cell 3 is the same as that of NiCd batteries. In this respect, the constant current charging devices used in NiCd batteries could here be used with a voltage cut-off for charging the lithium cell 3. However, there is a problem toward the end of the charging process when the lithium cell 3 reaches its end-of-charge voltage because in this case the voltage would rise when a constant current charging device is used, which could result in damage to the lithium cell 3 or its destruction. This is because the lithium cell 3 is no longer capable of taking in the energy supplied by the constant current charging device when the end-of-charge voltage has been reached. If the charging process is nevertheless continued, it results in damage to the lithium cell or its destruction.

In contrast to NiCd batteries, lithium cells 3 react very sensitively when excessively high voltages above the end-of-charge voltage are applied, so this must be prevented during the charging process.

The concept of the invention is then to terminate the charging process at the point in time at which the lithium cell 3 reaches or has reached its end-of-charge voltage. Within the scope of the invention, this can be achieved by the internal resistance of the battery unit (and not the lithium cell 3) being increased in such a way that the charging voltage of the battery unit is greater than a cut-off voltage that results in an automatic cut-off of the constant current charging device 1. It would alternatively also be possible to alter the internal resistance in such a way that the profile of the charging voltage that occurs in a NiCd battery, in particular the "-delta U" cut-off condition, is simulated without the end-of-charge voltage of the lithium cell 3 being exceeded.

When a lithium cell 3 is being charged, it is charged to approximately 80% when the lithium cell 3 has reached its end-of-charge voltage. This state of charge is completely acceptable for many applications so that it is possible and also acceptable to interrupt the charging process at this point in time.

When the lithium cell 3 is being charged, when its end-of-charge voltage is reached by means of the switch unit 4 connected in the charging current path, the total voltage is altered, and in this case increased, by the battery unit 2 in such a way that the cut-off voltage, for example 1.6 V per battery cell, is reached and the constant current charging device, for example an NiCd charging device, interrupts the charging process. The total voltage is increased by the internal resistance of the battery unit 2 being increased.

The switch unit 4 shown in FIG. 1 comprises a switch element 5 and a controller 6 that controls the switch element 5. The controller 6 monitors the cell voltage of the lithium cell 3 and activates the switch element 5 when the lithium cell 3 has reached its end-of-charge voltage. The switch element 5 is designed in such a way that a voltage increase caused by increasing the internal resistance has at least reached the cut-off voltage. To do this, in a simple alternative the switch element 5 can be designed, for example, such that it can be switched back and forth between two states. Alternatively, the switch element 5 can also be designed to enable as many in particular dynamic voltage increases as possible, for example by continually increasing the internal resistance.

Figure 2:
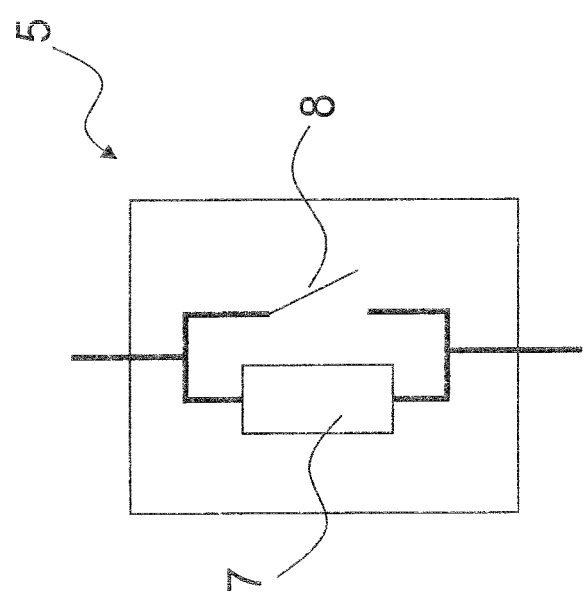
FIG. 2 shows an exemplary embodiment of a switch element of a switch unit of the battery unit.

FIG. 2 shows an exemplary embodiment of a switch element 5 of the switch unit 4. The switch element 5 comprises an ohmic resistor 7 and a controllable switch 8 that is connected to the controller 6. The switch 7 can be a controllable electromechanical and/or controllable electronic switch 7.

Whilst the switch 8 is closed, the resistor 7 is essentially bypassed by the switch 8 so that there is no or virtually no drop-off in voltage over the switch element 5 in spite of the charging current that is flowing. As soon as the controller establishes that the lithium cell 3 has reached the end-of-charge voltage, it opens the switch 8. When the switch 8 is open, the charging current flows through the resistor 7, combined with a corresponding drop-off in voltage. The constant current charging device 1 then recognizes the sum of the voltages at the lithium cell 3 and the switch element 5. The electrical resistor 7 is dimensioned in such a way that the sum of the voltages is greater than the cut-off voltage of the constant current charging device 1. This causes the charging process by the constant current charging device to be terminated or interrupted.

In one embodiment, it may be provided that the controller 6 is designed in such a way that the switch is opened when the charging voltage of the lithium cell 3 falls below a predetermined value so that the lithium cell is recharged.

The power that needs to be killed at the switch element 5, here at the resistor 7, is at a manageable and acceptable level for the present applications.

FIG. 3 shows a further exemplary embodiment of a switch element 5. The switch element 5 in FIG. 3 is an electronic component 9 that can be controlled by the controller 6 and alters the internal resistance of the battery unit 2 that is effective toward the constant current charging device 1 in such a way that voltage in excess of its end-of-charge voltage is not applied to the lithium cell 3 and a sufficient charging capacity of the lithium cell 3 can nevertheless be ensured. For example, the internal resistance can be dynamically adapted, in particular increased or lowered, so that, when a predetermined state of charge, e.g. the end-of-charge voltage, has been reached, the charging process is terminated and the charging process is restarted or continued when the voltage falls below a predetermined state of charge. In order to terminate the charging process, either the automatic cut-off of the constant current charging device 1 can be used here or the voltage profile that is typical for NiCd batteries simulated during the charging process but without exceeding the end-of-charge voltage. This can, for example, be achieved by the "-delta U" cut-off condition used for NiCd batteries bing simulated.

The switch element 5 can, for example, comprise an electronic component 9 with an impedance that can be altered or influenced by the controller 6 in the manner described above. Semiconductor components such as in particular MOSFET transistors and the like may be considered.

As is apparent in particular from the exemplary embodiments described and the associated charging method, the objects on which the invention is based can be achieved. It is in particular possible to replace the previously used environmentally harmful NiCd batteries with environmentally safe lithium-based replacement battery units without there being any need to make changes to the devices, such as charging devices, that are already used. The battery unit 2 can advantageously be designed in such a way that interfaces with the charging device, dimensions and other parameters and quantities match those of the previously used NiCd batteries. In this way it is possible to avoid compatability problems from the very beginning, which means that the battery unit 2 can be used instead of an NiCd battery without other measures. Another advantage consists in the fact that the weight of the lithium-based batteries, in particular with respect to the power density, is less than in comparable NiCd batteries. This has an additional positive effect in terms of a saving in weight, in particular in automotive engineering and especially aeronautical engineering.

LIST OF REFERENCE NUMERALS

1 Constant current charging device
2 Battery unit
3 Battery cell, lithium cell
4 Switch unit
5 Switch element
6 Controller
7 Ohmic resistor
8 Controllable switch
9 Electronic component

The invention claimed is:

1. A battery unit that can be connected to a constant current charging device for charging the battery unit, the constant current charging device having a plurality of poles and a cut-off voltage, comprising:
    an internal resistance;
    at least one lithium battery cell having a predetermined end-of-charge voltage; and
    at least one switch unit, wherein the at least one switch unit is configured to increase the internal resistance when the predetermined end-of-charge voltage has been reached, such that the voltage at the poles of the constant current charging device is greater than the cut-off voltage of the constant current charging device to terminate the charging process.

2. The battery unit as claimed in claim 1, wherein the switch unit is configured such that the internal resistance is increased depending on the charging voltage of the at least one lithium battery cell.

3. The battery unit as claimed in claim 1, wherein the switch unit comprises a controller and a controllable switch element coupled to the controller, wherein the controllable switch element is configured to increase the internal resistance, wherein the controller controls the controllable switch element.

4. The battery unit as claimed in claim 3, wherein the controllable switch element comprises at least one electronic component that is selected from the group consisting of ohmic resistors and semiconductor components with modifiable or controllable impedance.

5. The battery unit as claimed in claim 4, wherein the controllable switch element or the switch unit comprises a switch, by means of which the at least one electronic component and lithium battery cell can be connected in series to alter the internal resistance.

6. The battery unit as claimed in claim 3, wherein the controller controls the switch element based on the charging voltage of the at least one lithium battery cell.

7. The battery unit as claimed in claim 5, wherein said switch comprises at least one of an electromechanical switch and an electronic switch.

8. The battery unit as claimed in claim 7, wherein said electronic switch comprises a semiconductor switch.

9. The battery unit as claimed in claim 4, wherein said semiconductor component comprises a MOSFET transistor.

10. A charging method for charging a battery unit comprising at least one lithium battery cell having a predetermined end-of-charge voltage, wherein the battery unit has an internal resistance and can be connected to a constant current charging device for charging the battery unit, the constant current charging device having a plurality of poles and a cut-off voltage, the method comprising:
    using a switch unit of the battery unit to increase the internal resistance when the predetermined end-of-charge voltage has been reached, such that the voltage at the poles of the constant current charging device is greater than the cut-off voltage of the constant current charging device to terminate the charging process.

11. The method as claimed in claim 10, wherein the internal resistance is increased by connecting the at least one lithium battery cell in series with an electronic component having a predetermined impedance, or by increasing the predetermined impedance of the electronic component connected in series with the at least one lithium battery cell.

12. The method as claimed in claim 11, wherein the component is selected from the group consisting of ohmic resistors and semiconductor components with modifiable or controllable impedance.

13. The method as claimed in claim 11, wherein the series connection of the electronic component and the at least one lithium battery cell can be made or canceled using at least one of an electromechanical switch and an electronic switch.

14. The method as claimed in claim 10, wherein the internal resistance of the battery unit is decreased when the at least one lithium battery cell falls below a predetermined charging voltage.

15. The method as claimed in claim 12, wherein said semiconductor component comprises a MOSFET transistor.

16. The method as claimed in claim 13, wherein said at least one of the electromechanical switch and the electronic switch is a controllable switch.

* * * * *